United States Patent Office 3,168,549
Patented Feb. 2, 1965

3,168,549
BICYCLIC PHOSPHORUS-CONTAINING
CARBAMATES
Rudi F. W. Rätz, Hamden, Conn., assignor to Olin
Mathieson Chemical Corporation, New Haven, Conn.,
a corporation of Virginia
No Drawing. Filed Nov. 23, 1962, Ser. No. 239,824
12 Claims. (Cl. 260—461)

This invention relates to a series of sulfur-containing carbamates, and more particularly it relates to urethanes and thiourethanes having the following structural formula:

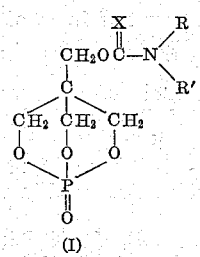

(I)

wherein X is selected from the class consisting of oxygen and sulfur, and
wherein R is selected from the class consisting of hydrogen, alkyl groups substituted and unsubstituted and having up to eighteen carbon atoms, substituted and unsubstituted aryl groups, cycloaliphatic groups, and
wherein R' is selected from the class consisting of hydrogen, alkyl groups substituted and unsubstituted and having up to eighteen carbon atoms, substituted and unsubstituted aryl groups, cycloaliphatic groups, alkylsulfonyl groups, and arylsulfonyl groups.

It has recently been found that the reaction of pentaerythritol with thiophosphoryl chloride results in the formation of a primary bicyclic alcohol having the structural formula:

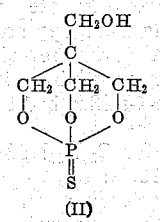

(II)

The chemical name for this alcohol is 1-hydroxymethyl-4-phospha-3,5,8-trioxabicyclo[2.2.2]octane-4-sulfide.

The primary object of this invention was to prepare a series of heretofore unknown sulfur-containing carbamates. Another object of this invention was to utilize the bicyclic alcohol (II) in the synthesis of said novel carbamates. Another object of this invention was to prepare novel carbamates having unique biological activity. Still another object of this invention was to provide an efficient process for the preparation of urethanes and thiourethanes having the structural Formula I. Other objects of this invention will be apparent from the following discussion.

These objects have been accomplished in accordance with the present invention. It has been found that the bicyclic alcohol (II) can be reacted with monofunctional isocyanates, monofunctional isothiocyanates, carbamyl chloride and with substituted carbamyl chlorides to provide a number of previously unknown sulfur-containing carbamates having the structural Formula I. Excellent yields of the carbamates have been obtained, and products of high purity can be prepared in accordance with this invention. An efficient process for the preparation of these derivatives is herein provided. Furthermore, it has been found that the carbamates prepared according to this invention possess biological activity which makes them useful as contact insecticides, herbicides and fungicides.

The following examples will serve to illustrate the preparation of some of the carbamates described herein. Example 1 is concerned with the preparation of the bicyclic alcohol (II), while the remaining examples are directed toward preparation of various carbamates. These examples are illustrative only, and they are not to be construed as limiting the scope of this invention.

Example 1

Into a 500 ml. round bottom flask was placed 99.0 g. (0.73 mole) of pentaerythritol and 123.5 g. (0.73 mole) of thiophosphoryl chloride. The flask was equipped with a reflux condenser which was connected to a drying tube filled with calcium chloride. The reaction mixture was heated by means of an oil bath to 160° C. and kept at this temperature for five hours. At this point no further hydrogen chloride was being evolved, and heating was terminated after one additional hour at 170° C. The mixture was allowed to cool to room temperature, and the slightly tan reaction product formed a cake which was first broken into lumps and then crushed into small pieces. The material was freed from some adhering sticky by-product after one washing with 150 ml. of cold ether. There was then obtained 143 g. of a free-flowing powder. This crude material was extracted with 750 ml. of boiling water from which the product crystallized in colorless small needles, M.P. 156°–158° C. During this extraction, some material remained undissolved and collected as a heavy oil at the bottom of the flask. The aqueous solution was separated from this oil by decantation through a folded filter. After one recrystallization from xylene, the purified product was isolated as shining long needles having a melting point of 160.5° C. The following analysis indicated that the bicyclic alcohol (II) had been obtained in high purity. Yield: 89.5 g. (63%)

Analysis.—Calcd. for $C_5H_9O_4PS$: C, 30.59; H, 4.62; P, 15.82; S, 16.35. Found: C, 30.70; H, 5.10; P, 15.70; S, 16.32.

Example 2

Into a 100 ml. round bottom flask was placed 5.93 g. (0.0303 mole) of the 1-hydroxymethyl derivative prepared in Ex. 1 and 4.975 g. (0.0303 mole) of p-nitrophenyl isocyanate. An oil bath was preheated to 145° C. and the flask immersed therein. Reaction started immediately with melting and finally with formation of a yellow crystal cake. After grinding the product, the resulting yellow powder was extracted with 30 ml. of ether and then dried. There was obtained 10.5 g. of dried crystalline material. Recrystallization is possible from refluxing glacial acetic acid in which the urethane however is only slightly soluble. By this method, yellow needlelike crystals were obtained which melted at 255° C. with decomposition. Recrystallization from dimethylformamide results in a lemon yellow crystalline powder showing partial melting at approximately 150° C. with resolidification and final melting at 259.5–261.5° C. The partial melting at 150° C. was due to the fact that the urethane was solvated with one molecule of dimethylformamide. A sample, recrystallized from dimethylformamide was heated for two hours at 180° C./0.1 mm. whereupon it lost the solvated dimethylformamide entirely. The following analytical data revealed that the desired 1 - (N-p-nitrophenylcarbamyloxymethyl)-4-phospha-3,5,8-trioxabicyclo[2.2.2]octane-4-sulfide had been obtained. Yield: 96.5%.

*Analysis.*—Cal'd for $C_{12}H_{13}N_2O_7PS$: C, 40.00; H, 3.62; N, 7.77. Found: C, 39.99; H, 4.13; N, 7.71.

The infrared spectrum of this compound showed the NH— absorption at $2.95\mu$, the urethane carbonyl group at $5.72\mu$, and the C—O bond at $8.3\mu$. The nitro group could be clearly recognized at $6.5\mu$ and $7.5\mu$.

Example 3

Into a 100 ml. round bottom flask was placed 9.8 g. (0.05 mole) of the 1-hydroxymethyl derivative prepared in Example 1. This material was melted by immersing the flask in a preheated oil bath at 170° C. Then 7.679 g. (0.05 mole) of p-chlorophenyl isocyanate was added in one portion to the melt. After a very short period, complete solidification of the mixture occurred. The resulting product was pulverized and twice extracted with 30 ml. portions of ether. After the residual solid material was dried, there was obtained 17.5 g. of a colorless solid material which represented a quantitative yield of urethane. This solid was recrystallized from glacial acetic acid, and small, colorless needles having a melting point of 249–250° C. were obtained. The following analytical data revealed that the desired 1-(N-p-chlorophenylcarbamyloxymethyl) - 4 - phospha - 3,5,8 - trioxabicyclo [2.2.2]octane-4-sulfide had been obtained.

*Analysis.*—Cal'd for $C_{12}H_{13}ClNO_5PS$: C, 41.22; H, 3.72; N, 4.10. Found: C, 41.04; H, 3.83; N, 4.10.

Example 4

Into a 100 ml. round bottom flask was placed 12.01 g. (0.0612 mole) of p-tolylsulfonyl isocyanate. Then 9.99 g. (0.051 mole) of the 1-hydroxymethyl derivative prepared in Ex. 1 was added in one portion to the flask with external cooling by an ice bath, and the components were thoroughly mixed together. The reaction mixture was allowed to warm to ambient temperature and after standing for one hour, 50 ml. of petroleum ether was added to the reaction flask with stirring. The mixture was filtered, and 21.0 g. of a crystalline solid was collected. This material was recrystallized from 75 ml. of glacial acetic acid, and fine, colorless needles having a melting point of 188–189° C. were obtained. The following analytical data revealed that the desired 1-(N-p-tolylsulfonylcarbamyloxymethyl) - 4 - phospha-3,5,8-trioxabicyclo[2.2.2]octane-4-sulfide had been obtained in high purity. Yield: 96%.

*Analysis.*—Calc'd for $C_{13}H_{16}NO_7PS_2$: C, 39.80; H, 4.08; N, 3.56. Found: C, 39.75; H, 4.40; N, 3.60.

The infrared spectrum of this compound showed a distinct band at $3.07\mu$ which is associated with the NH group. The urethane carbonyl group shows up at $5.8\mu$. Two strong absorptions at 7.6 and $8.6\mu$ are characteristic for the sulfonyl group.

Example 5

Into a 100 ml. round bottom flask was placed 9.8 g. (0.05 mole) of the 1-hydroxymethyl derivative prepared in Ex. 1 and 5.48 g. (0.0494 mole) of phenyl isocyanate. The compounds were thoroughly mixed together. The reaction flask was connected with a drying-tube bearing reflux condenser, and the mixture was heated by means of an oil bath to 170° C. At this temperature, a clear melt resulted. After heating the reaction mixture for five minutes, the mixture was allowed to cool to room temperature whereupon formation of a transparent glass took place. This glass-like material was transformed into a crystalline powder upon being stirred with a small amount of ether. After drying this crystalline material, 14.2 g. was obtained. This material was recrystallized from glacial acetic acid, and colorless, small needles having a melting point of 184–185° C. were obtained. The following analytical data revealed that the desired 1-(N-phenylcarbamyloxymethyl) - 4 - phospha-3,5,8-trioxabicyclo[2.2.2]octane-4-sulfide had been obtained. Yield: 98%.

*Analysis.*—Cal'd for $C_{12}H_{14}NO_5PS$: C, 45.71; H, 4.45; N, 4.45; P, 9.85; S, 10.15. Found: C, 45.43; H, 4.95; N, 4.70; P, 9.95; S, 10.62.

Example 6

Into a 50 ml. round bottom flask was placed 3.92 g. (0.020 mole) of the 1-hydroxymethyl derivative prepared in Ex. 1 and 2.0 g. (0.0202 mole) of n-butyl isocyanate. The mixture was heated for two hours to 115° C. An almost colorless, viscous melt resulted which was allowed to stand overnight at ambient temperature. The crude reaction product (6.3 g.) was a sticky, transparent material which, after treatment with 30 ml. of ether, formed a colorless, crystalline powder. After filtration, 4.5 g. of this powdery material was collected by suction filtration, and an additional amount of 1.0 g. of solid material was obtained by concentrating the filtrate to about ⅓ of the original volume. This solid material was recrystallized from 15 ml. of ethanol and colorless needles having a melting point of 102° C. were obtained. The following analytical data revealed that the desired 1-(N-n-butylcarbamyloxymethyl) - 4-phospha-3,5,8-trioxabicyclo[2.2.2] octane-4-sulfide had been obtained in high purity. Yield: 93.5%.

*Analysis.*—Calc'd for $C_{10}H_{18}NO_5PS$: C, 40.70; H, 6.11; N, 4.74; P, 10.49. Found: C, 40.47; H, 6.21; N, 4.88; P, 10.34

Example 7

Into a 100 ml. round bottom flask was placed 3.0 g. (0.153 mole) of the 1-hydroxymethyl derivative prepared in Ex. 1 and a molar excess of diethyl carbamylchloride. The mixture was heated using an oil bath, and at 135° C. hydrogen chloride was released from the reaction mixture. After two hours heating at 145° C., hydrogen chlorine evolution had ceased. The clear, slightly brown reaction mixture was allowed to stand overnight and a semi-solid product was obtained. This material was filtered on a sintered glass plate Buchner funnel, and 2.0 g. of shiny, colorless crystals were isolated. This material was washed with cold water to remove a very small amount of water-soluble diethylamine hydrochloride. The material was then recrystallized from dioxane to give colorless, prismatic crystals having a melting point of 177.5–178° C. The following analytical data revealed that the desired 1-(N - diethylcarbamyloxymethyl)-4-phospha-3,5,8-trioxabicyclo[2.2.2]octane-4-sulfide had been obtained. Yield: 42.2%.

*Analysis.*—Calc'd for $C_{10}H_{18}NPSO_5$: N, 4.74; P, 10.51. Found: N, 5.00; P, 10.63.

As shown in the preceding examples, sulfur-containing carbamates having the structural Formula I can be prepared in high yield and excellent purity in accordance with this invention.

An extremely wide range of monofunctional isocyanates can be reacted with the bicyclic alcohol (II) to yield urethanes included in the general structural formula I. Examples of monofunctional isocyanates which can be employed in the practice of this invention are: methyl isocyanate, ethyl isocyanate, n-propyl isocyanate, isopropyl isocyanate, n-butyl isocyanate, isobutyl isocyanate, allyl isocyanate, ω-chlorohexyl isocyanate, ethylcarbimidoacetate isocyanate, octadecyl isocyanate, cyclohexyl isocyanate, trifluoromethyl isocyanate, phenyl isocyanate, 2-nitrophenyl isocyanate, 3-nitrophenyl isocyanate, 4-nitrophenyl isocyanate, 2-chlorophenyl isocyanate, 3-chlorophenyl isocyanate, 4-chlorophenyl isocyanate, 4-bromophenyl isocyanate, 3-methoxyphenyl isocyanate, 4-methoxyphenyl isocyanate, o-tolyl isocyanate, m-tolyl isocyanate, p-tolyl isocyanate, p-ethoxyphenyl isocyanate, 2,4-dinitrophenyl isocyanate, 3,5-dinitrophenyl isocyanate, 2,4,6-trinitrophenyl isocyanate, 4-phenylazophenyl isocyanate, 1-naphthyl isocyanate, 2-naphthyl isocyanate, 3,4- dichlorophenyl isocyanate, methylsulfonyl isocyanate, phenylsulfonyl isocyanate and tolylsulfonyl isocyanate.

Likewise, monofunctional isothiocyanates of analogous structure to those listed above may be used in the practice of this invention. These isothiocyanates can be readily prepared by the reaction of various amines with thiophosgene in a manner similar to isocyanate preparation. Various isothiocyanates can also be prepared by reacting suitable halides with potassium thiocyanate in accordance with methods described in the literature.

Similarly, it has been found that other carbamates included in the structural Formula I may be prepared by the reaction of the bicyclic alcohol with various carbamyl chlorides. For example, carbamyl chloride prepared by the reaction of phosgene and ammonium chloride at 400° C. as disclosed by R. Gattermann and G. Schmidt in Ann., 1888, 244, 29, can be reacted with the bicyclic alcohol to give a urethane in which R and R′ in (I) are hydrogen atoms.

Other substituted carbamyl chlorides suitable for use in this invention may be prepared by the reaction of secondary amines and phosgene and subsequently reacted with the alcohol (II) to yield urethanes included in the Formula I. Examples of carbamyl chlorides which may be so utilized are: dimethylcarbamyl chloride, diethylcarbamyl chloride, diisopropylcarbamyl chloride, dioctylcarbamyl chloride, didodecylcarbamyl chloride, dioctadecylcarbamyl chloride, chloroformyl bis-(2-chloroethyl) amine, diphenylcarbamyl chloride, di-p-tolylcarbamyl chloride, di-chlorophenylcarbamyl chloride, di-bromophenylcarbamyl chloride and dicyclohexylcarbamyl chloride.

The sulfur-containing carbamates of this invention may be prepared by reacting the bicyclic alcohol with the monofunctional isocyanates and isothiocyanates and the various carbamyl chlorides at temperatures of from about 60–200° C. However, it has been found that a reaction temperature range of about 100–180° C. is preferred for best operating conditions. Most of the reactions can be performed at atmospheric pressure, but several of the more volatile isocyanates and carbamyl chlorides may be advantageously reacted in pressure equipment.

A molar excess of either reactant can be utilized in the formation of the carbamate esters described herein. However it has been found that higher yields of product and easier product work-up are obtained when substantially equivalent amounts of bicyclic alcohol and the reacting isocyanate, isothiocyanate and carbamyl chloride are used.

The novel carbamates of this invention are useful as contact insecticides particularly in the area of mite control. For instance, the carbamates which were prepared in Examples 3, 4, and 5 have been found to be very effective miticides as shown by the test described hereinafter.

Kidney bean plants were planted and were used in a test when the primary leaves were four days old. The primary leaves were then each infested with approximately 50 two-spotted spider mites from a stock culture. One or two trifoliate leaflets were placed on each primary leaf. After standing for one day, the stock leaves were removed, and the plant was then dipped in water to clean off excess sand. The mite infested leaves were divided into three groups, and each group was dipped into a different 0.1% aqueous dispersion of the three carbamates hereinbefore identified. The leaves were allowed to stand for two days before they were inspected. In each case, a high incidence of mite mortality was observed, and this was especially noticeable in the case of the urethane prepared in Example 3.

The biological activity displayed by the carbamates of this invention is not limited to the area of mite control. The compounds have also been found to be effective as fungicides. They are also useful in controlling certain noxious plants. In the various applications described above, the carbamates may be conveniently utilized in the form of dilute aqueous dispersions.

What is claimed is:
1. An organic phosphorus compound having the structural formula:

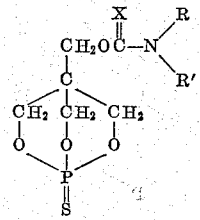

wherein
X is selected from the class consisting of oxygen and sulfur, and
wherein R is selected from the class consisting of hydrogen, alkyl having 1–18 carbon atoms, phenyl, tolyl, and cyclohexyl, and
wherein R′ is selected from the class consisting of hydro, alkyl having 1–18 carbon atoms, cyclohexyl, phenyl, tolyl, naphthyl, nitrated phenyl, halogenated phenyl, phenyl having a lower alkoxy substituent, phenylsulfonyl, tolylsulfonyl and lower alkylsulfonyl.

2. An organic phosphorus compound having the structural formula:

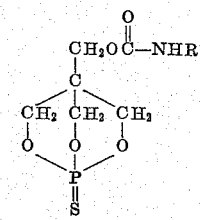

R being nitrated phenyl.

3. 1 - (N - p - nitrophenylcarbamyloxymethyl)-4-phospha-3,5,8-trioxabicyclo[2.2.2]octane-4-sulfide.

4. An organic phosphorus compound having the structural formula:

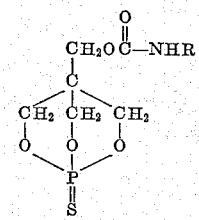

R being halogenated phenyl.

5. 1 - (N - p - chlorophenylcarbamyloxymethyl) - 4 - phospha-3,5,8-trioxabicyclo[2.2.2]octane-4-sulfide.

6. 1 - (N - (phenylcarbamyloxymethyl) - 4 - phospha-3,5,8-trioxabicyclo[2.2.2]octane-4-sulfide.

7. 1 - (N - p - benzenesulfonylcarbamyloxymethyl) - 4-phospha-3,5,8-trioxabicyclo[2.2.2]octane-4-sulfide.

8. 1 - (N - p - tolylsulfonylcarbamyloxymethyl) - 4-phospha-3,5,8-trioxabicyclo[2.2.2]octane-4-sulfide.

9. An organic phosphorus compound having the structural formula:

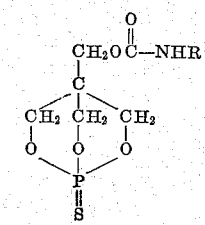

R being alkyl having from 1–18 carbon atoms.

10. 1 - (N - n - butylcarbamyloxymethyl)-4-phospha-3,5,8-trioxabicyclo[2.2.2]octane-4-sulfide.

11. An organic phosphorus compound having the structural formula:

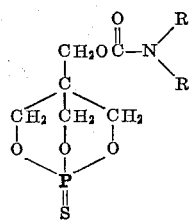

wherein R is alkyl having 1–18 carbon atoms.

12. 1 - (N - diethylcarbamyloxymethyl) - 4 - phospha-3,5,8-trioxabicyclo[2.2.2]octane-4-sulfide.

References Cited by the Examiner
UNITED STATES PATENTS

| | | | |
|---|---|---|---|
| 2,862,019 | 11/58 | Schrader | 260—461.112 |
| 2,915,429 | 12/59 | Scherer et al. | 260—461.112 |
| 3,018,216 | 1/62 | Maxwell et al. | 260—461.112 |
| 3,038,001 | 6/62 | Wadsworth | 260—461.112 |

OTHER REFERENCES

Migrdichian: "The Chemistry of Organic Cyanogen Compounds" (1947), Reinhold Publishing Corp., New York, N.Y., pp. 382, 384.

Saunders et al.: "Polyurethanes: Chemistry and Technology," High Polymers, vol. XVI (1962), Interscience Publishers, New York, N.Y., p. 87.

CHARLES B. PARKER, *Primary Examiner.*
IRVING MARCUS, *Examiner.*

UNITED STATES PATENT OFFICE
CERTIFICATE OF CORRECTION

Patent No. 3,168,549 February 2, 1965

Rudi F. W. Rätz

It is hereby certified that error appears in the above numbered patent requiring correction and that the said Letters Patent should read as corrected below.

Column 1, lines 15 to 24, for that portion of the formula reading:

    read    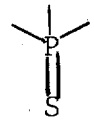

column 6, lines 20 and 21, for "hydro" read -- hydrogen --; line 56, strike out the opening parenthesis, second occurrence.

Signed and sealed this 22nd day of June 1965.

(SEAL)
Attest:

ERNEST W. SWIDER
Attesting Officer

EDWARD J. BRENNER
Commissioner of Patents